UNITED STATES PATENT OFFICE.

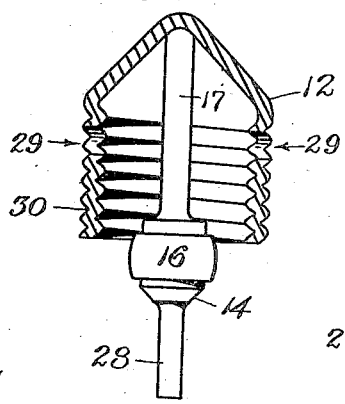
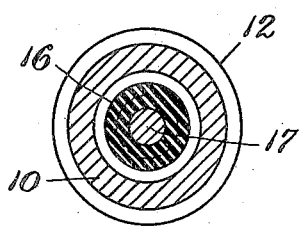
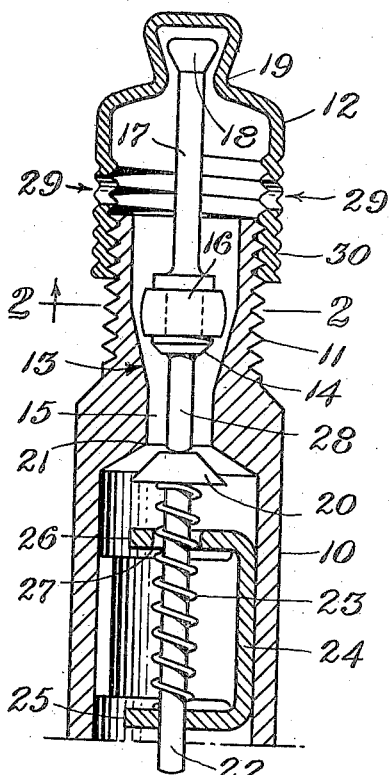
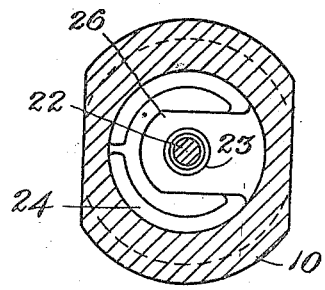
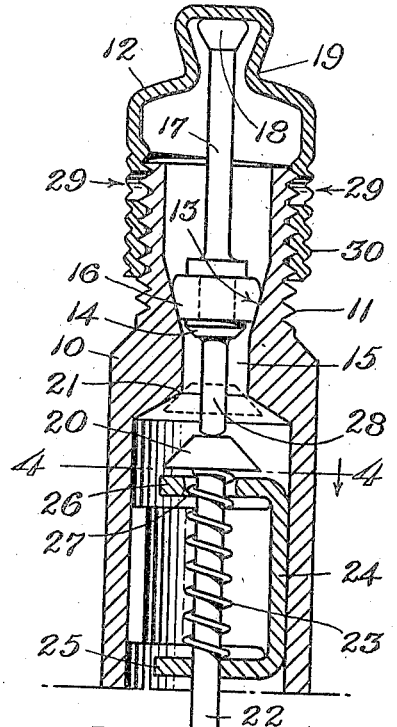

FREDERIK NIELSEN, OF BOSTON, MASSACHUSETTS.

VALVE.

1,082,232.  Specification of Letters Patent.  Patented Dec. 23, 1913.

Application filed November 1, 1912. Serial No. 729,055.

*To all whom it may concern:*

Be it known that I, FREDERIK NIELSEN, a subject of the King of Denmark, and resident of Boston, in the county of Suffolk and State of Massachusetts, have invented certain new and useful Improvements in Valves, of which the following is a specification.

This invention relates to valves, and particularly to valves for pneumatic tires.

The essential feature of the invention is the combination of a check valve which opens inwardly, a removable valve member for closing the mouth of the valve body more securely than the check valve will close it, and a removable screw-cap or cover for the mouth of the valve body whereby the removable valve is tightly seated and whereby the check valve is unseated, the removable cap being adapted, when in one position, to hold both valves open at the same time to permit deflation, the cap having one or more vents through which the air from the tire may escape into the atmosphere.

Of the accompanying drawings which illustrate the invention: Figure 1 represents a longitudinal section, on an enlarged scale, of the outer end of a pneumatic-tire valve, showing both valve members separated from their seats to permit deflation. Fig. 2 represents a cross section in the plane indicated by line 2—2 of Fig. 1. Fig. 3 represents a section similar to Fig. 1 but showing the removable valve closed tightly against its seat, and the check valve fully opened, the closed position of the check valve being indicated by dotted lines. Fig. 4 represents a cross section in the plane indicated by line 4—4 of Fig. 3. Fig. 5 represents a modification in which the cap shown in section and the valve member shown in elevation are not connected, as distinguished from the swivel connection shown in Figs. 1 and 3 whereby the cap and valve member are separably connected.

The same reference characters indicate the same parts wherever they occur.

A tubular valve body of well known form is indicated at 10. The upper or outer end of the valve body is externally threaded, as indicated at 11, for the reception of a removable screw-cap 12 and also for the reception of a suitable coupling whereby an air-supply hose may be connected for the purpose of inflating the tire to which the valve body 10 is attached. The mouth or outer end of the valve body is formed with a valve seat 13 for the reception of a valve member 14. The valve seat is so disposed that the air passage 15 is closed when the valve member 14 is inserted as far as it will go, and opened when the valve member is withdrawn. The valve seat 13, as shown, is tapering, but the exact form is immaterial. The valve member 14 carries a bushing 16 of soft material, such as rubber, which is adapted to engage the valve seat to effect the closure of the air passage. The valve member is provided with a shank or stem 17 which in the form shown by Figs. 1 and 3 has swivel connection with the screw-cap 12. For this purpose the stem is formed with a head 18 and the cap is formed with a crown which is contracted at 19 to less diameter than the head, whereby the cap and stem are inseparably connected and whereby the head is afforded a loose bearing in the crown of the cap. The connecting portions of the cap and stem afford relative universal movement of the cap and valve, the valve stem being enabled to swing laterally in any direction relatively to the cap to compensate for inaccuracy in formation of the valve body or cap. For example, if the screw-threads are off center or not in exact alinement with the air passageway, or if the air passageway is eccentric, the valve 16 may swing laterally and be correctly seated, notwithstanding such inaccuracies as would be likely to occur in either the valve body or cap.

When the cap is screwed down upon the thread 11 it forces the bushing 16 tightly against the valve seat 13, as shown by Fig. 3; and when the cap is unscrewed and removed, the valve member is likewise removed.

A check valve, indicated at 20, is provided for retaining the air which is forced into the tire. This check valve is adapted to be seated against a shoulder 21 and is so disposed as to open inwardly or downwardly. The check valve is shown as having a stem 22 and a helical spring 23 surrounding the stem. The function of the spring is to keep the valve seated against the shoulder 21. The valve is mounted in a holder 24 which is adapted to be inserted into the bore of the valve body from the inner end. This holder, as shown by Fig. 4, is of cylindric formation and is split, and is adapted to expand against the interior surface of the valve body and remain in the desired position by frictional engagement with the valve body. The holder has two ears 25 and 26 which extend transversely and which afford means for holding and guiding the valve stem centrally. The spring 23 is compressed between the ear 25 and the valve head 20 and is adapted to slip through a hole 27 in the ear 26. This hole is of such size as to enable the spring to move freely through it, and the spring is of such diameter as to afford slight lateral play of the stem 22. The valve head 20 is therefore capable of slight lateral movement which enables it to readily adjust itself to the seat or shoulder 21.

The shank or stem 17 of the removable valve has an extension 28 which is adapted to engage the check valve 20 for the purpose of depressing the latter so that the tire may be deflated when both valves are separated from their seats as shown by Fig. 1. In order to provide for the escape of air to the atmosphere, the cap 12 is provided with one or more vents, two of such vents being shown at 29. These vents are shown and are preferably located in the side of the cap rather than in the crown, for various reasons, one of which is that it is desirable to retain as much stock as possible in the crown to give it the necessary strength and rigidity to withstand the strain of forcing the removable valve against its seat. In a full-sized device the cap 12 would be made of thin sheet metal, and would be undesirably weakened if the vent or vents were formed in the crown; but when the vents are formed in the side or cylindric part of the cap they do not weaken the cap in such manner as to cause it to be affected by the resistance of the removable valve. Another reason for forming the vents in the side of the cap is that they may be closed when the cap is screwed on sufficiently to seat the main valve. See Fig. 3, in which the vents are shown below the mouth of the valve body. The closing of the vents makes the cap dustproof. Incidental to locating the vents so that they will be closed by the threaded end 11 of the valve body, they must be formed in the threaded part 30 of the cap, and consequently if dirt should accumulate in the vents it would be loosened by screwing the cap on or off and would be readily blown out. For example, when the vehicle to which the device is attached is in use, dust or mud would be deposited in the holes 29 and would become caked. Upon subsequently unscrewing the cap the dirt would be loosened by the action of the screw-thread 11 so that it would be readily blown out either when removing the cap or later applying it.

In the form shown by Fig. 5 there is no physical connection between the main valve and the screw-cap other than mere engagement. The crown of the cap in this modification is preferably conical in order to centralize the valve stem.

Although the cap 12 and valve 14 in Figs. 1 and 3 are connected so as to prevent accidental separation, they are nevertheless adapted to be separated if sufficient force is applied to withdraw the head 18 from the crown of the cap. For this purpose the head and crown are formed so that the contracted part or throat of the crown will be expanded by wedging action of the head. The metal of which the cap is made is sufficiently ductile to permit such expansion, and it has sufficient spring to cause the throat to contract again and thus automatically confine the head when it is forced into the crown. If the bushing 16 should become worn or otherwise damaged, the valve can be readily withdrawn from the cap and a new valve inserted without damaging the cap.

It should be understood that the spring 23 which acts upon the check valve 20 may be omitted, the outward flow of air when the tire is inflated being sufficient to seat the check valve. It should also be understood that the check valve may be of any other form than frusto-conical, the valve extension 28 being adapted to open a check valve of one form as well as another.

It is common practice for every pneumatic-tired vehicle to carry a number of inner tubes, each being provided with a valve; and it is customary to roll or fold the extra tubes into a small compass for storage, and in order to do this it is necessary to deflate them. When deflating a tube under these circumstances it has hitherto been necessary either to remove the valve from the valve casing or to insert an instrumentality in the mouth of the valve casing to hold the check valve open during the operation of folding or rolling the tube, in order that the air may be expelled. The inconvenience of holding the valve open or entirely removing it from the casing is avoided by the present invention, which provides for the escape of air when the parts are in the position shown by Fig. 1.

I claim:

1. An inflating valve comprising a valve casing, a valve member, a check valve, and a cap, said casing having a seat for said valve member and a seat for said check valve, the exterior of said casing having a screw-thread and said cap having an internal thread for coöperating with said thread of the casing, and means operable by onward movement of said cap for opening said check valve and thereafter closing said valve member, said cap having a vent in its threaded part, which vent is disposed to remain uncovered by the threaded part of the casing until after said check valve is opened, and to be covered by said threaded part of the casing when the cap is screwed on as far as it can go.

2. An inflating valve comprising a valve casing, a cap therefor, a removable valve, and a check valve, said casing having seats for said valve member and check valve respectively, said casing having an external screw-thread and said cap having a coöperative internal screw-thread, said cap and valve member having coöperative connecting portions for keeping them connected, said removable valve member being movable against its seat by onward movement of said cap, and means for transmitting seating movement of said removable valve member to said check valve to unseat the latter before the removable valve member engages its seat, said cap having a vent for the escape of air from the casing when said removable valve member and said check valve are both unseated.

3. The combination with the body of an inflating valve having an external screw-thread; of an internally threaded cap for engaging said external screw-thread to close the mouth of said body, and a valve for coöperating with the interior of said valve body, said cap having a hollow crown and a contracted throat, and said valve having a head and a reduced neck, said head being disposed in said crown and the diameter thereof being greater than that of said throat.

4. An inflating valve comprising a valve body having an air passageway, a check valve therein, said valve body having a seat for said check valve and an intermediate valve seat between the mouth of said valve body and said check valve seat, a cap for the mouth of said valve body, said cap and valve body having coöperative connecting screw-threads, a valve carried by said cap for coöperating with said intermediate valve seat, and means movable by closing movement of the valve last mentioned for opening said check valve, said cap having a vent arranged to permit the escape of air when said cap-supported valve is moving toward coöperative relation with its seat.

5. An inflating valve comprising a valve body having an air passageway, a check valve therein, said valve body having a seat for said check valve, a closure for the mouth of said passageway, a valve carried by said closure, said valve body having a seat for the last-mentioned valve, said closure and valve body having coöperative connecting screw-threads for forcing the last-mentioned valve against its seat, means operable by said closure for opening said check valve while closing the other valve, said closure having a vent for the escape of air while said closure is holding both of said valves open.

In testimony whereof I have affixed my signature, in presence of two witnesses.

FREDERIK NIELSEN.

Witnesses:
WALTER P. ABELL,
P. W. PEZZETTI.